United States Patent
Wässingbo

(10) Patent No.: US 8,725,727 B2
(45) Date of Patent: May 13, 2014

(54) SYSTEM AND METHOD FOR DETERMINING WEBSITE POPULARITY BY LOCATION

(75) Inventor: Tomas Karl-Axel Wässingbo, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1016 days.

(21) Appl. No.: 12/236,690

(22) Filed: Sep. 24, 2008

(65) Prior Publication Data

US 2010/0082526 A1  Apr. 1, 2010

(51) Int. Cl.
  *G06F 17/30*  (2006.01)
(52) U.S. Cl.
  USPC .................... 707/732; 707/733; 707/734
(58) Field of Classification Search
  USPC ................. 707/706, 732, 733, 734
  See application file for complete search history.

(56) References Cited

U.S. PATENT DOCUMENTS

| | | | | |
|---|---|---|---|---|
| 5,317,323 | A * | 5/1994 | Kennedy et al. | 342/457 |
| 6,407,703 | B1 * | 6/2002 | Minter et al. | 342/450 |
| 6,496,701 | B1 * | 12/2002 | Chen et al. | 455/456.5 |
| 6,650,877 | B1 * | 11/2003 | Tarbouriech et al. | 455/186.1 |
| 2001/0029185 | A1 * | 10/2001 | Hildebrand et al. | 455/456 |
| 2002/0094824 | A1 * | 7/2002 | Kennedy et al. | 455/456 |
| 2003/0055831 | A1 | 3/2003 | Ryan et al. | |
| 2005/0164712 | A1 * | 7/2005 | Kennedy et al. | 455/456.1 |
| 2006/0022048 | A1 * | 2/2006 | Johnson | 235/462.1 |
| 2006/0123014 | A1 | 6/2006 | Ng | |
| 2006/0206624 | A1 | 9/2006 | Wang et al. | |
| 2007/0061302 | A1 * | 3/2007 | Ramer et al. | 707/3 |
| 2007/0260635 | A1 | 11/2007 | Ramer et al. | |
| 2008/0214157 | A1 * | 9/2008 | Ramer et al. | 455/414.1 |
| 2010/0082526 | A1 * | 4/2010 | Wassingbo | 707/603 |

FOREIGN PATENT DOCUMENTS

| | | |
|---|---|---|
| WO | 2007126530 | 11/2007 |
| WO | 2008027844 | 3/2008 |
| WO | 2008027851 | 3/2008 |

OTHER PUBLICATIONS

Dan Jerker B. Svantesson, Geo-location technologies and other means of placing borders on the 'borderless' Internet, Sep. 1, 2004.*
James A Muir & P.C. van Oorschot, Internet Geolocation and Evasion, Apr. 8, 2006.*
Maged N Kamel Boulos, Location-based health information services: a new paradigm in personalized information delivery, Jan. 10, 2003.*

(Continued)

*Primary Examiner* — Ajay Bhatia
*Assistant Examiner* — Kurt Mueller
(74) *Attorney, Agent, or Firm* — Renner, Otto, Boisselle & Sklar, LLP

(57) ABSTRACT

Internet websites that are popular for users in a specific location are determined and displayed to a user of an electronic device. The popularity information may be of benefit to users in the location or to users of inherently portable devices, such as a mobile telephone or a laptop computer, that travel to the location. In one embodiment, position data relating to devices used to access websites is used to establish statistics regarding the most visited websites based on location. For instance, positioning data may be added to "webpage look-up/URL requests" that are made by the devices. This data may be transmitted to a server for deriving of the statistics.

16 Claims, 3 Drawing Sheets

(56) References Cited

OTHER PUBLICATIONS

Henning Schulzrinne & Knarig Arabshian, Providing Emergency Services in Internet Telephony, 2002.*

International Search Report and Written Opinion from corresponding International Application No. PCT/IB09/000465.
International Preliminary Report on Patentability from corresponding International Application No. PCT/IB09/000465.

* cited by examiner

SYSTEM AND METHOD FOR DETERMINING WEBSITE POPULARITY BY LOCATION

TECHNICAL FIELD OF THE INVENTION

The technology of the present disclosure relates generally to Internet searching and, more particularly, to a system and method for determining which websites are popular among Internet users in a particular location.

BACKGROUND

Access to the Internet is increasingly more widespread. For example, Internet users may access Internet content (e.g., "websites," which are typically arranged as a group of "webpages") using a variety of devices. Exemplary devices that are capable of accessing Internet content include desktop and laptop computers, and mobile telephones.

Also, the content available through the Internet is increasingly more diverse. Users may identify popular Internet content by using "top lists." Top lists attempt to identify the most visited websites. Top lists may be established for websites in a category (e.g., sports, social networking, clothes shopping, etc.). Top lists may be generated to identify the most visited sites on a world-wide basis or on a country-by-country basis.

Top lists are typically compiled by Internet service providers (ISPs) or by entities that host websites used by a variety of users, such as "portal" websites or search engine websites. These compilations may be derived from monitoring the activity of the users of the ISPs or websites.

SUMMARY

While conventional top lists have value, there are contexts in which a user may desire more specific information. To enhance the value of top lists, the present disclosure describes systems and methods for generating more context-specific top lists. In particular, disclosed are techniques for identifying Internet websites that are popular for users in a specific location, such as a city, neighborhood in a city, an airport, or any other location of interest. As used in this document, a location is an identifiable geographical point or area that is part of a larger geographical area for which Internet usage is monitored. The popularity information may be of benefit to users in the location or to users of inherently portable devices, such as a mobile telephone or a laptop computer, that travel to the location. In one embodiment, position data relating to devices used to access websites is used to establish statistics regarding the most visited websites based on location. For instance, positioning data may be added to "webpage look-up/URL requests" that are made by the devices. This data may be transmitted to a server for deriving of the statistics.

According to one aspect of the disclosure, a method of determining popularity of Internet content by location includes collecting and storing Internet usage data from plural electronic devices across a geographic area, the Internet usage data comprising data objects, each data object generated when a user of one of the electronic devices uses a browser to visit a website and each data object including an identification of the visited website and a position of the electronic device from which a request for the visited website was made; and for a location within the geographic area and for a requesting electronic device, analyzing the Internet usage data to construct a list of the most visited websites by electronic devices for which the positions in the data objects are in the location, and transmitting the list to the requesting electronic device.

According to one embodiment of the method, the electronic devices from which the Internet usage data is collected are portable electronic devices.

According to one embodiment of the method, the portable electronic devices are mobile telephones.

According to one embodiment of the method, the location is specified by the requesting electronic device.

According to one embodiment of the method, the location corresponds to a current physical position of the electronic device.

According to one embodiment of the method, the list is ordered by popularity rank.

According to one embodiment of the method, the list is filtered to remove websites that have universal popularity across the geographic area.

According to one embodiment of the method, the list is filtered by a time parameter.

According to one embodiment of the method, the time parameter is used to identify current website usage for the location.

According to one embodiment of the method, the time parameter is used to identify website popularity over a specified period of time.

According to one embodiment, the method further includes revising the list based on a redefinition of the location by the requesting electronic device, the redefinition being one of an enlargement of a size of the location or a reduction of the size of the location.

According to another aspect of the disclosure, a method of determining popularity of Internet content by location using an electronic device includes requesting a list of popular websites by a location within a geographic area from a server; receiving a list of popular websites from the server; and displaying a map of the location together with the received list of popular websites;

According to one embodiment of the method, the websites in the displayed list are active links to the corresponding websites.

According to one embodiment of the method, the location is specified by the requesting electronic device.

According to one embodiment of the method, the location corresponds to a current physical position of the electronic device.

According to one embodiment of the method, the list is filtered to remove websites that have universal popularity across the geographic area.

According to one embodiment of the method, the list is filtered by a time parameter.

According to one embodiment of the method, the time parameter is used to identify current website usage for the location.

According to one embodiment of the method, the time parameter is used to identify website popularity over a specified period of time.

According to one embodiment, the method further includes revising the list based on a redefinition of the location by the requesting electronic device, the redefinition being one of an enlargement of a size of the location or a reduction of the size of the location.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
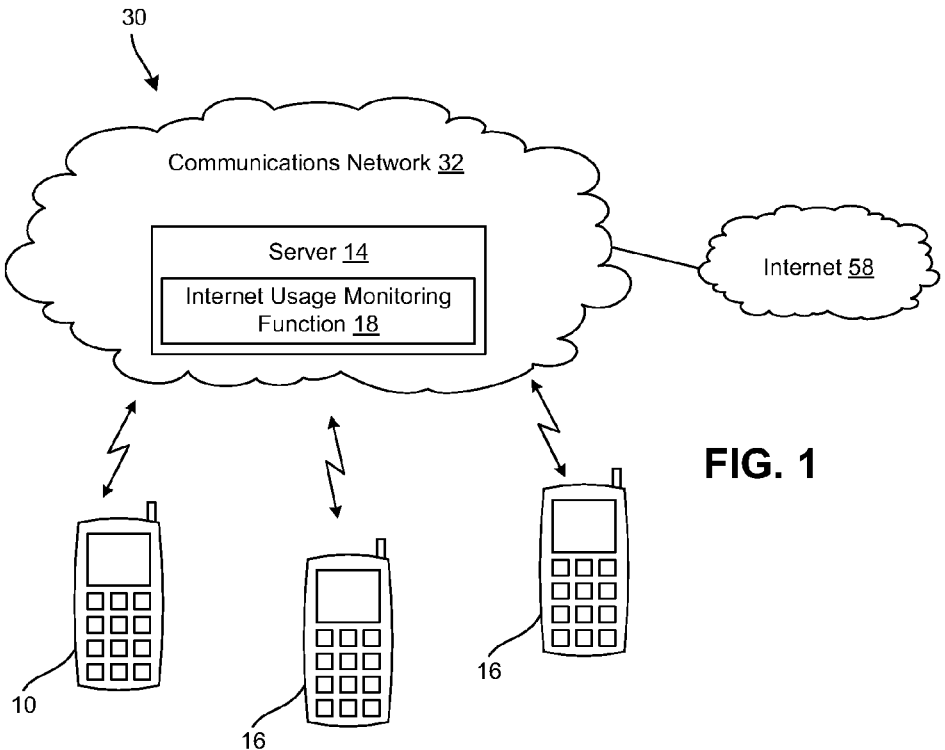
FIG. 1 is a schematic diagram of a communications system in which electronic devices may operate and access the Internet.

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a smartphone, a portable communication apparatus, etc.

Figure 2:
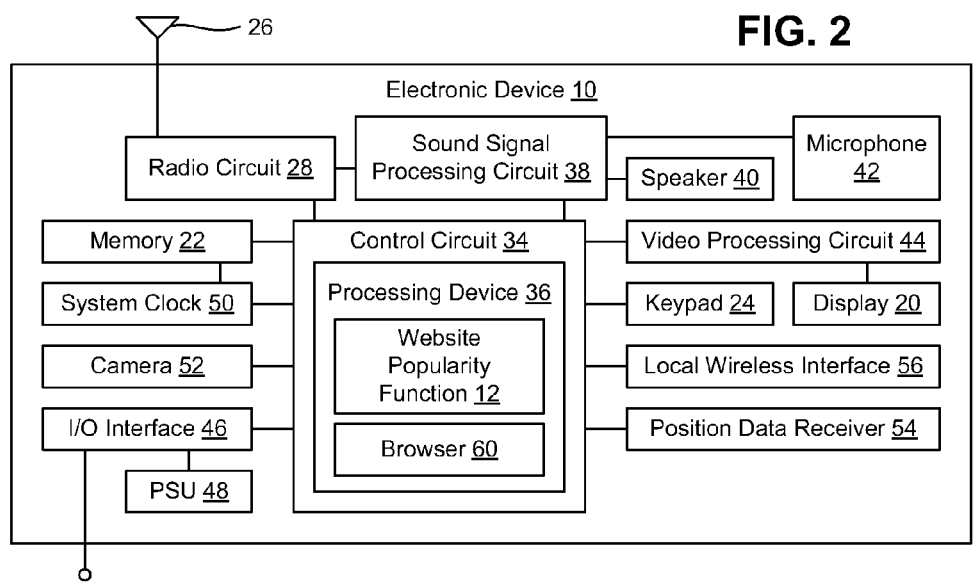
FIG. 2 is a schematic block diagram of a mobile telephone as an exemplary electronic device that operates in the communications system of FIG. 1.

Referring initially to FIGS. 1 and 2, an electronic device 10 is shown. The electronic device 10 includes a website popularity function 12 that is configured to identify popular websites by location to a user. Additional details and operation of the website popularity function 12 will be described in greater detail below. The website popularity function 12 may be embodied as executable code that is resident in and executed by the electronic device 10. In one embodiment, the website popularity function 12 may be one or more programs that are stored on a computer or machine readable medium. The website popularity function 12 may be a stand-alone software application or form a part of a software application that carries out additional tasks related to the electronic device 10.

The electronic device 10 may operatively communicate with a server 14 that analyzes Internet usage data from the electronic device 10 and from other electronic devices 16 that are operated by a variety of users. In one embodiment, the server 14 includes an Internet usage monitoring function 18 to process Internet usage data and determine website popularity by location. Additional details and operation of the Internet usage monitoring function 18 will be described in greater detail below. The Internet usage monitoring function 18 may be embodied as executable code that is resident in and executed by the server 14. In one embodiment, the Internet usage monitoring function 18 may be one or more programs that are stored on a computer or machine readable medium. The Internet usage monitoring function 18 may be a stand-alone software application or form a part of a software application that carries out additional tasks related to the server 14.

Through the following description, exemplary techniques for determining webpage popularity by location are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered a method that the corresponding device is configured to carry out. Also, while the website popularity function 12 and the Internet usage monitoring function 18 are implemented in software in accordance with an embodiment, such functionality could also be carried out via dedicated hardware or firmware, or some combination of hardware, firmware and/or software.

The electronic device 10 may include a display 20. The display 20 displays information to a user such as operating state, time, telephone numbers, contact information, various menus, etc., that enable the user to utilize the various features of the electronic device 10. The display 20 also may be used to visually display content received by the electronic device 10 and/or retrieved from a memory 22 of the electronic device 10. The display 20 may be used to present images, video and other graphics to the user, such as photographs, mobile television content, Internet pages, and video associated with games.

A keypad 24 provides for a variety of user input operations. For example, the keypad 24 may include alphanumeric keys for allowing entry of alphanumeric information (e.g., telephone numbers, phone lists, contact information, notes, text, etc.), special function keys (e.g., a call send and answer key, multimedia playback control keys, a camera shutter button, etc.), navigation and select keys or a pointing device, and so forth. Keys or key-like functionality also may be embodied as a touch screen associated with the display 20. Also, the display 20 and keypad 24 may be used in conjunction with one another to implement soft key functionality.

The electronic device 10 includes communications circuitry that enables the electronic device 10 to establish a communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 22, executing applications to allow user interaction with the data, displaying video and/or image content associated with the data, outputting audio sounds associated with the data, and so forth.

In the exemplary embodiment, the communications circuitry may include an antenna 26 coupled to a radio circuit 28. The radio circuit 28 includes a radio frequency transmitter and receiver for transmitting and receiving signals via the antenna 26.

The radio circuit 28 may be configured to operate in a mobile communications system 30 (FIG. 1). Radio circuit 28 types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 26 and the radio circuit 28 may represent one or more than one radio transceiver.

The system 30 may include a communications network 32 having the server 14 (or servers) for managing calls placed by and destined to the electronic device 10, transmitting data to and receiving data from the electronic device 10 and carrying out any other support functions. The server 14 communicates with the electronic device 10 via a transmission medium. The transmission medium may be any appropriate device or assembly, including, for example, a communications base station (e.g., a cellular service tower, or "cell" tower), a wireless access point, a satellite, etc. The network 32 may support the communications activity of multiple electronic devices 10, 16 and other types of end user devices. As will be appreciated, the server 14 may be configured as a typical computer system used to carry out server functions and may include a processor configured to execute software containing logical instructions that embody the functions of the server 14 and a memory to store such software and any related databases. In alternative arrangements, the electronic device 10 may wirelessly communicate directly with another electronic device 10 (e.g., another mobile telephone or a computer) and without an intervening network. As indicated, the server 14 may store and execute the Internet usage monitoring function 18. In another embodiment, communications activity of the electronic devices 10, 16 may be managed by a server that is different from the server 14 that executes the Internet usage monitoring function 18.

The electronic device 10 may include a primary control circuit 34 that is configured to carry out overall control of the functions and operations of the electronic device 10. The control circuit 34 may include a processing device 36, such as a central processing unit (CPU), microcontroller or microprocessor. The processing device 36 executes code stored in a memory (not shown) within the control circuit 34 and/or in a separate memory, such as the memory 22, in order to carry out operation of the electronic device 10. For instance, the processing device 36 may execute code that implements the website popularity function 12. The memory 22 may be, for example, one or more of a buffer, a flash memory, a hard drive, a removable media, a volatile memory, a non-volatile memory, a random access memory (RAM), or other suitable device. In a typical arrangement, the memory 22 may include a non-volatile memory for long term data storage and a volatile memory that functions as system memory for the control circuit 34. The memory 22 may exchange data with the control circuit 34 over a data bus. Accompanying control lines and an address bus between the memory 22 and the control circuit 34 also may be present.

The electronic device 10 further includes a sound signal processing circuit 38 for processing audio signals transmitted by and received from the radio circuit 28. Coupled to the sound processing circuit 38 are a speaker 40 and a microphone 42 that enable a user to listen and speak via the electronic device 10. The radio circuit 28 and sound processing circuit 38 are each coupled to the control circuit 34 so as to carry out overall operation. Audio data may be passed from the control circuit 34 to the sound signal processing circuit 38 for playback to the user. The audio data may include, for example, audio data from an audio file stored by the memory 22 and retrieved by the control circuit 34, or received audio data such as in the form of voice communications or streaming audio data from a mobile radio service. The sound processing circuit 38 may include any appropriate buffers, decoders, amplifiers and so forth.

The display 20 may be coupled to the control circuit 34 by a video processing circuit 44 that converts video data to a video signal used to drive the display 20. The video processing circuit 44 may include any appropriate buffers, decoders, video data processors and so forth. The video data may be generated by the control circuit 34, retrieved from a video file that is stored in the memory 22, derived from an incoming video data stream that is received by the radio circuit 28 or obtained by any other suitable method.

The electronic device 10 may further include one or more input/output (I/O) interface(s) 46. The I/O interface(s) 46 may be in the form of typical mobile telephone I/O interfaces and may include one or more electrical connectors. The I/O interfaces 46 may form one or more data ports for connecting the electronic device 10 to another device (e.g., a computer) or an accessory (e.g., a personal handsfree (PHF) device) via a cable. Further, operating power may be received over the I/O interface(s) 46 and power to charge a battery of a power supply unit (PSU) 48 within the electronic device 10 may be received over the I/O interface(s) 46. The PSU 48 may supply power to operate the electronic device 10 in the absence of an external power source.

The electronic device 10 also may include various other components. For instance, a system clock 50 may clock components such as the control circuit 34 and the memory 22. A camera 52 may be present for taking digital pictures and/or movies. Image and/or video files corresponding to the pictures and/or movies may be stored in the memory 22. A position data receiver 54, such as a global positioning system (GPS) receiver, Galileo satellite system receiver or the like, may be involved in determining the position of the electronic device 10. A local wireless interface 56, such as an infrared transceiver and/or an RF transceiver (e.g., a Bluetooth chipset) may be used to establish communication with a nearby device, such as an accessory (e.g., a PHF device), another mobile radio terminal, a computer or another device.

It will be appreciated that the electronic device 10 may access content from the Internet 58 via the network 32 or through another interface to the Internet 58. As will be appreciated, the electronic device 10 may include an Internet browser 60 to facilitate the browsing of Internet webpages that are hosted by various Internet servers. The Internet browser 60 may be, for example, a computer program stored by the memory 22 and executed by the processing device 36. The website popularity function 12 may form part of the browser 60, may be a plug-in for the browser 60, or may operate in a coordinated manner with the browser 60 to effectuate the functions described in this document.

Figure 3:
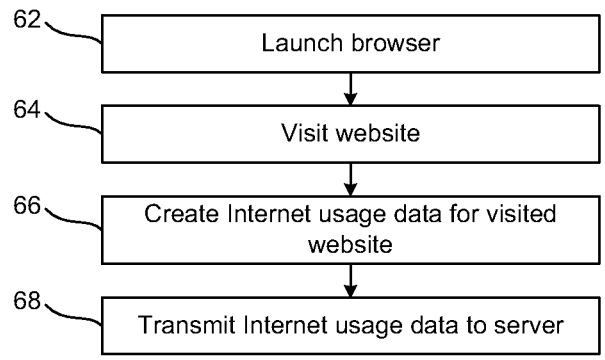
FIG. 3 is a flow chart representing an exemplary method of collecting data with an electronic device for use in determining website popularity by location.

With additional reference to FIG. 3, illustrated are logical operations to implement an exemplary method of collecting data with an electronic device for use in determining website popularity by location. The exemplary method may be carried out by executing an embodiment of the website popularity function 12, for example. Thus, the flow chart of FIG. 3 may be thought of as depicting steps of a method carried out by one of the electronic devices 10, 16. The same or similar operations may be carried out by plural electronic devices 10, 16 so that the server 14 may obtain sufficient data to determine website popularity based on specified locations. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted.

In one embodiment, the data collection may be made only with portable electronic devices, such as mobile telephones and laptop computers. In another embodiment, the data collection may be made only with certain types of portable electronic devices, such as mobile telephones. In still another embodiment, the data collection may be made with both portable electronic devices and relatively stationary electronic devices, such as desktop computers.

Regardless of device type, the logical flow for collecting data for use in determining website popularity by location may begin in block 62 where a user of the electronic device 10, 16 launches an Internet browser. Common Internet browsers that are commercially available at the time that this document was written include Internet Explorer available from Microsoft Corporation and Firefox available from the Mozilla Organization. For portable electronic devices, such as mobile telephones, the Internet browser may be a wireless application protocol (WAP) browser or other suitable software.

Next, in block 64, an Internet website (or a specific webpage) may be identified by user action when the user attempts to access the Internet website. For instance, the user may type in or otherwise specify an address for a website, such as in the form of a uniform resource locator (URL) for the website. In other situations, the user may select a website from a browsing history, a list of favorite websites, a cache, or other technique. In other situations the website may be identified by selecting a link to a website from a list of search results. The attempt to access the Internet website results in the generation of a request that is transmitted to the network 32 for the return of the corresponding Internet content. As an example, the request may be a "webpage look-up/URL request."

In block 66, a data object containing Internet usage data relating to the visited website specified in block 64 may be created. In one embodiment, the request may be tagged with additional information to create the data object. For instance, the additional information may be data that the Internet usage monitoring function 18 may use to determine website popularity by location. For this purpose, the data may be a position of the electronic device 10, 16 at the time that the request is made. The position may be specified using, for example, GPS coordinates or the identifier of a base station or network access point that services the electronic device 10, 16. Identifying position information for a portable device has become quite common. Therefore, specific techniques for identifying the position of portable devices will not be described in detail. Exemplary techniques for determining position include, but are not limited to, GPS, assisted GPS (A-GPS), and mobile originated location request (MO-LR) in GSM and UMTS networks. If data is collected from stationary devices, the position of the stationary devices may be determined. The position may be determined in the same manners as may be used for portable devices. Alternatively, the user may specify the position or the position may be part of a device profile.

Other data that may be included in the tagged request may include the time at which the request is made. Still other data may include an identification of the type of device used to place the request (e.g., mobile telephone, laptop computer, etc.) or the type of browser (e.g., computer browser or WAP browser).

The tagged request, or other data object, may be transmitted to the server 14 in block 68. The tagged request may constitute Internet usage data. As described below, Internet usage data from plural requests from plural electronic devices 10, 16 may be used by the server 14 to identify the most visited websites as a function of location.

A tagged request is one example of a data object that may be used to communicate Internet usage data to the server 14. Another exemplary data object may be a message addressed to the server 14 that contains one or more of an identity of the visited website, the position of the electronic device 10, 16 at the time of the website visit, the time of the website visit, the type of electronic device 10, 16, the type of connection to the Internet, the type of Internet browser that was used, etc.

Figure 4:
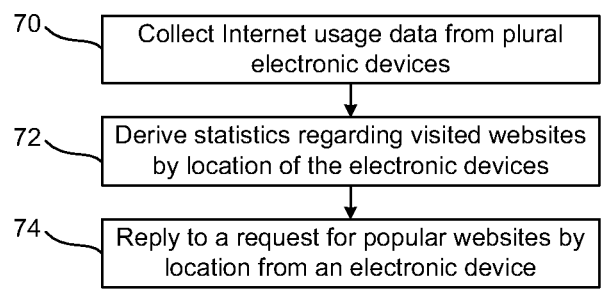
FIG. 4 is a flow chart representing an exemplary method of determining website popularity by location.

With additional reference to FIG. 4, illustrated are logical operations to implement an exemplary method of determining website popularity by location. The exemplary method may be carried out by executing an embodiment of the Internet usage monitoring function 18, for example. Thus, the flow chart of FIG. 4 may be thought of as depicting steps of a method carried out by the server 14. It will be appreciated that the server 14 may be part of the network domain of the communications network 32, as illustrated. Alternatively, the server 14 may be outside the domain of the communications network 32, but may receive the Internet usage data from the electronic devices 10, 16. Although FIG. 4 shows a specific order of executing functional logic blocks, the order of executing the blocks may be changed relative to the order shown. Also, two or more blocks shown in succession may be executed concurrently or with partial concurrence. Certain blocks also may be omitted.

In one embodiment, the determining of website popularity by location may be based on Internet usage data from only portable electronic devices, such as mobile telephones and laptop computers. In another embodiment, the determining may be based on Internet usage data from certain types of portable electronic devices, such as mobile telephones. In still another embodiment, the determining may be based on Internet usage data from both portable electronic devices and relatively stationary electronic devices, such as desktop computers.

The logical flow for determining website popularity by location may begin in block 70 where Internet usage data may be collected from (e.g., received from) plural electronic devices 10, 16. In an exemplary embodiment, the Internet usage data may be in the form of the data objects as described above. Therefore, the Internet usage data includes an identification of a website (e.g., in the form of a URL or other webpage identification information) and a position of the device requesting the website at the time of request. Other information may include the time of the request, type of requesting device, the type of connection to the Internet, the type of Internet browser that was used, etc.

Next, the Internet usage data may be processed in block 72. The processing of the Internet usage data may include creating statistics regarding Internet usage by location. In one embodiment, the requests may be categorized by location and then by website. A database may be used to store the categorized Internet usage data so that a list of the most popular websites may be determined for any location. Popularity may be determined by identifying which websites were visited the most by users of the electronic devices 10, 16 in the location.

In block 74, the server 14 may reply to a request from the electronic device 10 for a list of popular websites by a location. Using the collected Internet usage information and the location specified by the electronic device 10, the Internet usage monitoring function may determine which websites are the most popular among users in the location. The identified websites may be ordered from most popular to least. In some embodiments, the list may be limited to a predetermined number of websites, such as five websites, ten websites, or twenty-five websites. In some embodiments, the ordered list may further include scoring information to provide a sense of how popular the websites are relative to one another. The scoring information may be the number of times that users requested the website or some other mathematical function of this information. The location for which the list is generated may be specified by the user of the electronic device 10 or may be automatically determined based on the current physical position of the electronic device 10.

Figure 5:
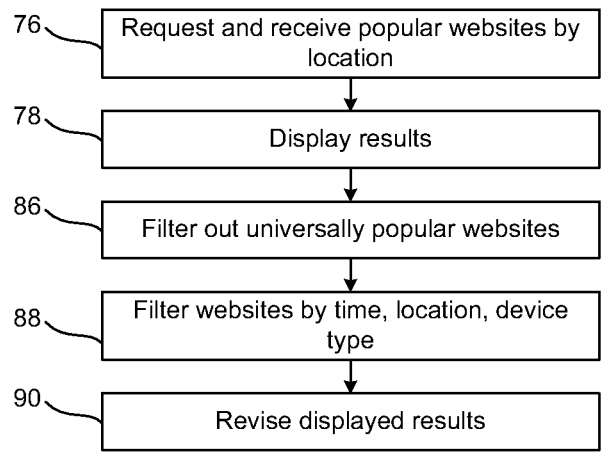
FIG. 5 is a flow chart representing an exemplary method of user interaction with information of website popularity by location.

With additional reference to FIG. 5, illustrated are logical operations to implement an exemplary method of providing information regarding website popularity by location to a user of the electronic device 10. The exemplary method may be carried out by executing an embodiment of the website popularity function 12, for example. Thus, the flow chart of FIG. 5 may be thought of as depicting steps of a method carried out by the electronic device 10. Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted.

The method may begin in block 76 where a request for a list of popular websites for a specified location is transmitted to the server 14. This request may be initiated by user action or by an automated feature of the electronic device 10. The request may be the same as the request to which the server responds in block 74 of FIG. 4. The specified location may correspond to a current physical position of the electronic device or may be a user specified location (e.g., a location to which the user may intend to travel or have some other interest). The location may be specified in terms of a state or province, a postal code, a county, a municipality, a census block, a user delineated region (e.g., as drawn on a map), a prominent characteristic of an area (e.g., a college campus or an airport), a radius from the position of the electronic device 10, or any another manner of partitioning a larger geographic area. In one embodiment, the user of a mapping and satellite view website or a 3D terrain viewing website may identify a location and submit a request to the server 14 for the list of most popular websites for the user-identified location.

In response to the request, the electronic device 10 may receive the list of the most popular websites by on Internet usage data from electronic devices 10, 16 in the location. The list may be ordered by most popular to least popular and may include a predetermined number websites (e.g., the five most popular websites or the ten most popular websites). The list may include identifiers for the websites (e.g., URLs) and may be in the form of links so that the user may select an entry from the list to browse to the corresponding website.

In block 78, the returned list may be displayed to the user of the electronic device 10. In one embodiment, the list may be displayed in conjunction of a map of the location for the returned results. With additional reference to FIG. 6, an exemplary graphical user interface 80 is shown. The interface 80 may be displayed on the display of the electronic device 10, and may include a map 82 of the location and a list 84 of popular websites for the location. In the illustrated example, the location, as reflected in the map 82, is of the greater New York City area and shows parts of the boroughs of New York (e.g., Manhattan, Staten Island, Brooklyn, etc.) and New Jersey. The list 84 is an ordered list of the five most popular websites visited by electronic devices that share Internet usage data with the server 14. As will be appreciated, the list 84 may include more than or less than five websites.

The user may be provided with an option to filter the list 84 to exclude websites that have widespread popularity. For instance, in block 86, the list may be filtered so that websites that routinely fall in the list of popular websites for multiple locations in the area for which Internet usage data is collected are omitted from the list displayed to the user. In one embodiment, websites that fall within a predetermined number (e.g., 10, 25 or 100) of the most popular websites for the entire area for which Internet usage data is collected may be omitted using the filter. As an example, the top 10, top 25 or top 100 websites for all users from which data is collected may be excluded from the list of popular websites for the specified location. In this manner, popular search engine websites, social networking websites, Internet retailers and other websites that have universal appeal may be excluded to provide an indication of locally popular websites.

Figure 6:
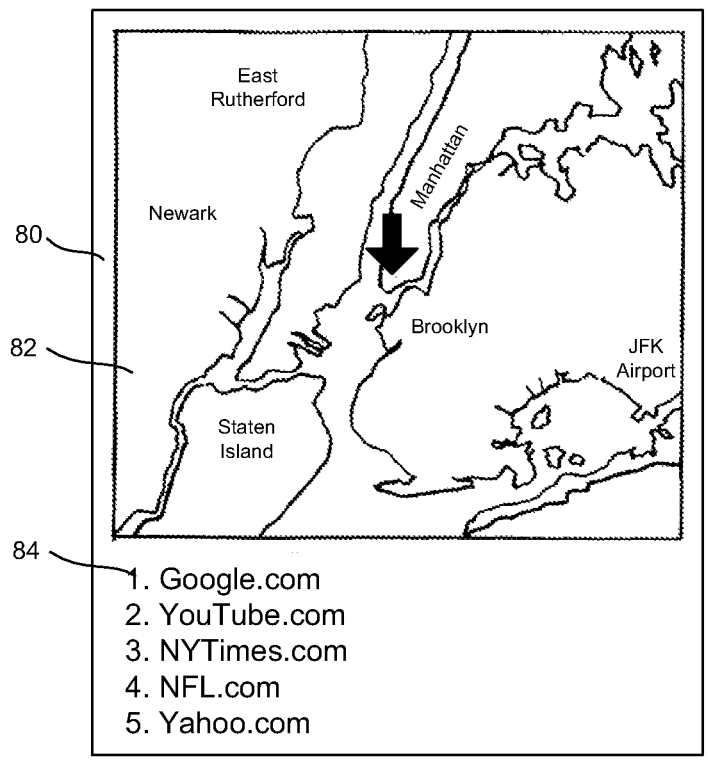
FIG. 6 is a representation of a graphical user interface to display website popularity by location.

In the illustrated example of FIG. 6, before such filtering the list 84 may include exemplary websites for Google, YouTube, the New York Times, the National Football League (NFL) and Yahoo. Of these, four may have universal popularity, including Google and Yahoo (popular information and search engine sites), YouTube (a popular video sharing website), and the NFL (a league of professional American-style football teams across the United States). Each of these websites may have popularity beyond New York. The New York Times, on the other hand, relates to a respected newspaper and news organization. Although the New York Times has appeal outside New York City, many of its readers are likely located in and around New York City. After the filtering to omit universally popular websites, the list may remove the four universally popular websites and include websites that survive the filtering. The surviving websites may have less local popularity that the universally popular websites, but are more indicative of local preferences in Internet usage. Following the representative example of New York City as shown in FIG. 6, an exemplary list 84 of websites after filtering may include New York Times (which has moved up in the ordered list to the top spot by the removal of other websites), followed by other websites that are popular for the location, but were less popular than the universally popular websites. For purposes of example, websites for the New York Area that may follow the New York Times might hypothetically be websites for the New York Yankees baseball team, the Metropolitan Museum of Art, the New York/New Jersey Port Authority, and a New York City city-guide website.

Other filtering may be carried out to refine the displayed results. For example, in block 88, the user may filter the results by time, location and/or device type. The processing to effectuate the filtering of block 86 and/or block 88 may be carried out by the electronic device 10 or by the server 14, which has more immediate access to the database of Internet usage data from which new results may be ascertained depending on the requested filtering. Following filtering of the results, revised results may be displayed as part of the graphical user interface 80 in block 90.

Filtering by time may include determining the most popular websites for the location at the present time. Filtering by time also may be used to determine the most popular websites for the location over the last hour, over last two hours, during the current day, over the last seven days, over the last month, or any other specified duration.

Filtering by device type may include returning results by excluding or including requests may be certain types of devices. For instance, the user may seek the most popular websites requested by mobile devices to the exclusion of stationary devices. In another example, the user may seek the most popular websites by devices that interface with the Internet through a certain type of connection. One filter setting may be, for example, to request popular websites for devices that interface with the Internet using a mobile access network (e.g., a cellular carrier network) to the exclusion of devices that interface with the Internet through local area networks (LANs), digital subscriber lines (DSL), etc.

Figure 7:
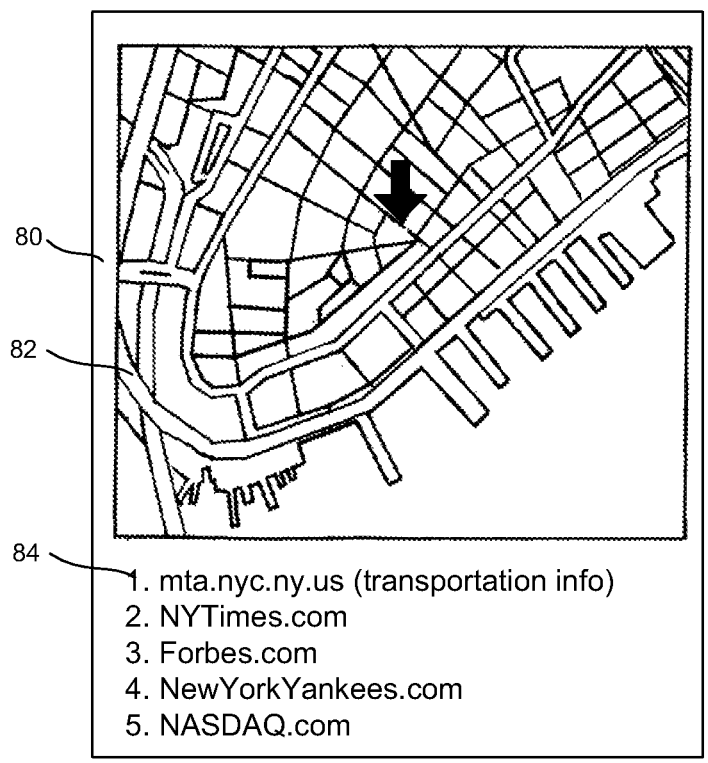
FIG. 7 is another representation of a graphical user interface to display website popularity by location.

Filtering by location may include "zooming-in," "zooming-out" or panning with respect to the location of the returned results. For instance, if results are returned for a metropolitan area as is found in the example of FIG. 6, the user may zoom-in to identify popular websites by a more specific location, such as lower Manhattan, Newark Airport, Central Park, New York University, or any other portion of the originally specified location. As an example, FIG. 7 shows the graphical user interface 80 where the user has zoomed-in from the map 86 of FIG. 6 on the Wall Street area of lower Manhattan. As will be appreciated, the Wall Street area has a high concentration of financial service companies and is home to the New York Stock Exchange. The list of popular websites may be updated to correspond to the more refined location. In the example of FIG. 7, the list may show a different set of websites than were returned for the example of FIG. 6. By way of example, popular websites for the Wall Street area may be websites for the Metropolitan Transportation Authority subway schedule, the New York Times, Forbes Magazine, the New York Yankees, the NASDAQ, and so forth.

Zooming out may have the effect of enlarging the specified location. For example, if the specified location we the Wall Street area, zooming out may revise the location to be the New York City area of FIG. 6. Panning may shift the location. For example, if the specified location we the Wall Street area, the user may pan the location to correspond to midtown Manhattan.

The user also may be able to specify a location so as to place a request with the server 14 to return popular websites in a location other than a location that corresponds to the current position of the electronic device 10. In this manner, the user may identify websites that are popular in locations all over the world or other geographic area monitored by the server (e.g., cities such as Chicago, London, Lund Sweden, etc.).

It is contemplated that the list of popular websites by location may be an interesting and fun feature to have on an electronic device 10. The feature may be of particular use to travelers who are unfamiliar with locally relevant websites that provide information regarding local transportation services, local news, local events, local dining, and so forth. The returned results may be of interest due to the relative popularity of the websites by others in the location, which may be an indicator of the quality and/or relevancy of the content of the websites. In addition, the relative popularity of a website in a location over other websites may be useful in planning the placement of advertising. For instance, if a website is found to be popular in a particular city, the owner of the website may use this data to seek advertisers for products or services in the location. Advertisers also may seek locally popular websites for the targeted placement of advertisements.

Although certain embodiments have been shown and described, it is understood that equivalents and modifications falling within the scope of the appended claims will occur to others who are skilled in the art upon the reading and understanding of this specification.

What is claimed is:

1. A method of determining popularity of Internet content by location, comprising the following steps, each carried out by a server:
   for each of plural electronic devices, receiving a data object when a respective user of the electronic device uses a browser of the electronic device to visit a website, each data object containing an identification of the visited website and a position of the corresponding electronic device at the time of the website visit;
   collecting and storing the visited website identifications and corresponding positions in a database;
   receiving a request from a requesting electronic device, the request specifying a location and the request being a request for an identification of the most popular websites visited by electronic devices that were in the location at the time of the corresponding website visits;
   analyzing the database and constructing a list of a predetermined number of websites that were visited the most by the users of the electronic devices for which the positions match the location specified in the request, wherein the list is ordered from the website that was visited the most by the users of the electronic devices for which positions match the location specified in the request to the website that was visited the least by the users of the electronic devices for which positions match the location specified in the request; and
   transmitting the list to an electronic device that generated the request.

2. The method of claim 1, wherein the location in the request corresponds to a current physical position of the electronic device that generated the request.

3. The method of claim 1, wherein the location in the request is defined by a user of the electronic device that generated the request.

4. The method of claim 1, wherein the electronic devices from which the data objects are received are portable electronic devices.

5. The method of claim 4, wherein the portable electronic devices are mobile telephones.

6. The method of claim 1, wherein the list is filtered to remove websites that have universal popularity across a geographic area that contains the specified location.

7. The method of claim 1, wherein the list is filtered by a time parameter.

8. The method of claim 7, wherein the time parameter is used to identify current website usage for the specified location.

9. The method of claim 7, wherein the time parameter is used to identify website popularity over a specified period of time.

10. The method of claim 1, further comprising revising the list based on a redefinition of the specified location, the redefinition being one of an enlargement of a size of the specified location or a reduction of the size of the specified location.

11. The method of claim 1, wherein the websites in the list are active links to the corresponding websites.

12. The method of claim 1, wherein the list is filtered by device type.

13. The method of claim 12, wherein the list is filtered to exclude website visits by stationary devices.

14. The method of claim 1, wherein the specified location is a city.

15. The method of claim 1, wherein the specified location is a metropolitan area or portion thereof.

16. The method of claim 1, wherein the list includes scoring information to indicate relative popularity of the websites in the list.

* * * * *